United States Patent [19]
Geppert

[11] Patent Number: 5,815,892
[45] Date of Patent: Oct. 6, 1998

[54] PROFILE CLAMP

[75] Inventor: Helmut Geppert, Karlstein, Germany

[73] Assignee: Rasmussen GmbH, Maintal, Germany

[21] Appl. No.: 986,543

[22] Filed: Dec. 8, 1997

[30] Foreign Application Priority Data

Jun. 12, 1996 [DE] Germany .................. 196 50 675.1

[51] Int. Cl.$^6$ .................................................. B65D 63/00
[52] U.S. Cl. .................. 24/20 R; 24/20 CW; 24/20 EE; 24/20 TT; 24/23 EE
[58] Field of Search ................ 24/20 R, 20 CW, 24/20 EE, 20 TT, 20 W, 22, 23 EE, 456, 484

[56] References Cited

U.S. PATENT DOCUMENTS

| 4,202,568 | 5/1980 | Strom . | |
|---|---|---|---|
| 4,547,953 | 10/1985 | Livolsi | 29/453 |
| 4,713,863 | 12/1987 | Jennings | 24/20 R |
| 4,773,129 | 9/1988 | Muhr | 24/20 R |
| 4,996,749 | 3/1991 | Takahashi | 24/20 R |
| 5,095,564 | 3/1992 | Kruger | 285/197 |
| 5,353,478 | 10/1994 | Spors | 24/20 R |

FOREIGN PATENT DOCUMENTS

| 0 003 192 | 7/1979 | European Pat. Off. . |
| 0 631 085 | 12/1994 | European Pat. Off. . |
| 0 636 826 | 2/1995 | European Pat. Off. . |
| 2 209 117 | 9/1972 | Germany . |
| 30 38 491 | 6/1984 | Germany . |
| 691 06 057 | 7/1995 | Germany . |
| 279525 | 5/1987 | Spain . |
| 9402209 | 8/1994 | Spain . |
| 589 817 | 7/1977 | Switzerland . |
| 735271 | 10/1952 | United Kingdom . |
| 1589038 | 5/1978 | United Kingdom . |

Primary Examiner—Victor N. Sakran
Attorney, Agent, or Firm—Darby & Darby

[57] ABSTRACT

A profile clamp includes a clamp band that has a first axial end, a second axial end, a first circumferential end portion and a second circumferential end portion. A first flange depends from the first axial end. A second flange depends from the second axial end. A first clamping wall projects radially outwardly from the first circumferential end portion. A second clamping wall projects radially outwardly from the second circumferential end portion. An approximately radially extending locking hook is disposed at a free end of the first clamping wall to form a slightly angled tongue. An approximately circumferentially extending web is connected to a radial outer end of the second clamping wall. The web has an opening disposed adjacent to a free end of the web. The free end of the web is angled slightly radially outwardly. The opening is defined by a plurality of edges. An abutment is formed by at least one of the edges. The abutment, together with the locking hook, forms a snap closure that is actuated by moving the first clamping wall towards the second clamping wall so that the clamp band moves from an open position to a closed position. The hook has a width that is smaller than a width of the web. The first and second clamping walls each have side flanges that merge into the flanges of the adjacent clamp band. In the closed position, a stop for the web is formed by a radially outwardly facing surface of the first clamping wall and a radially outwardly facing surface of the side flanges of the first clamping wall. The stop is disposed adjacent to the locking hook.

6 Claims, 2 Drawing Sheets

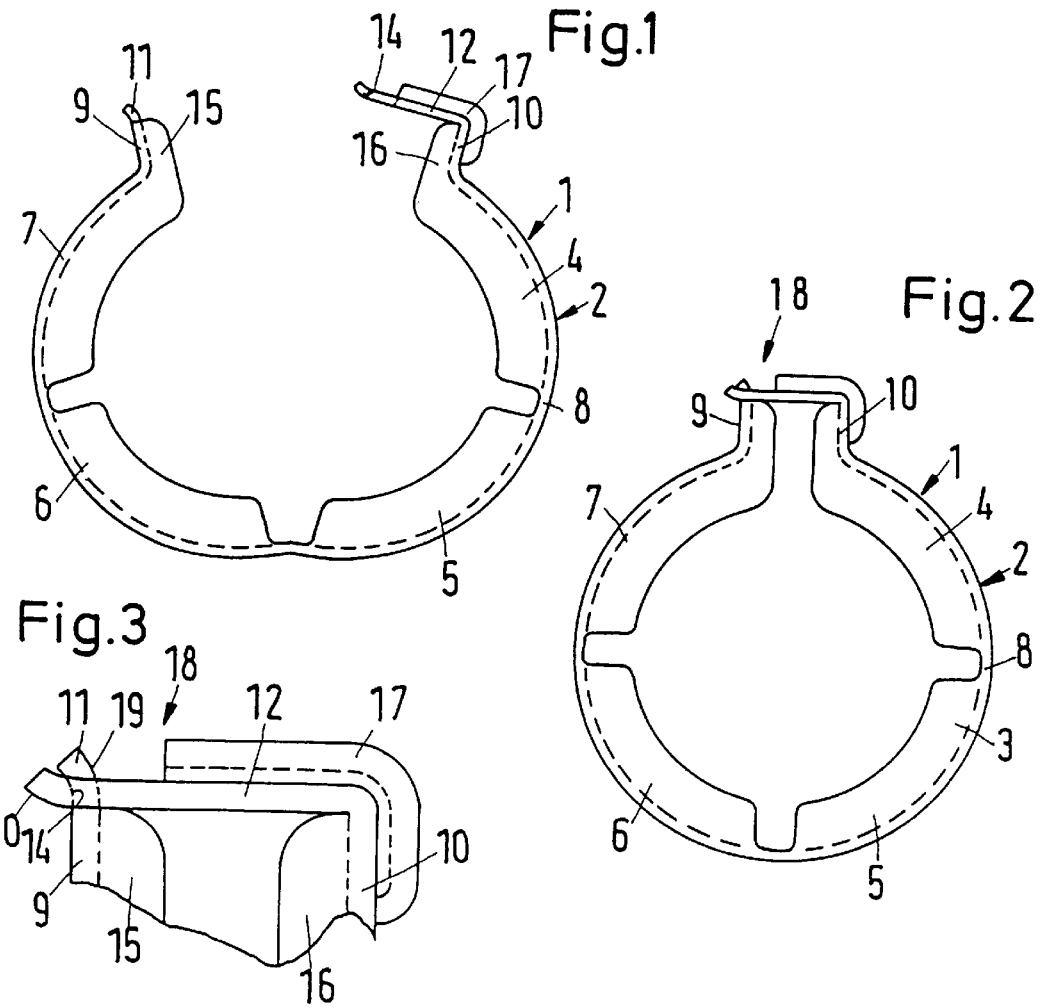
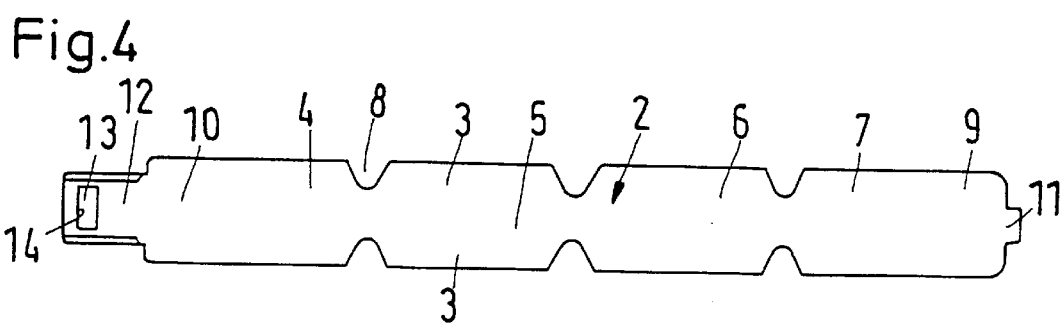
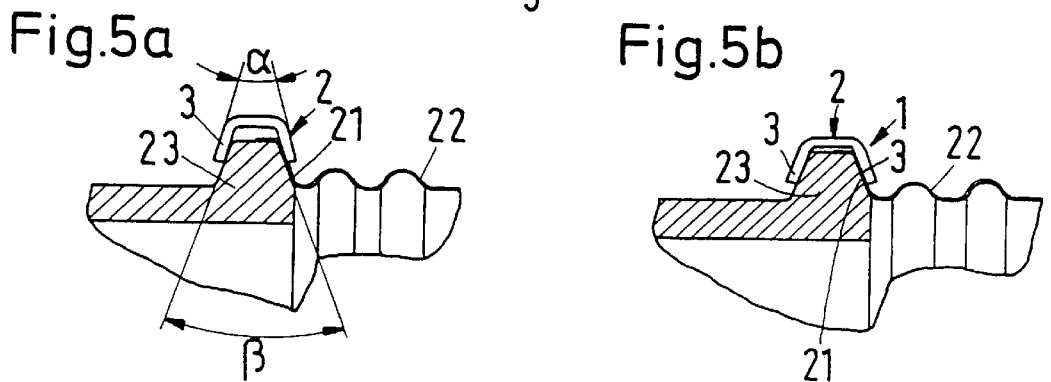

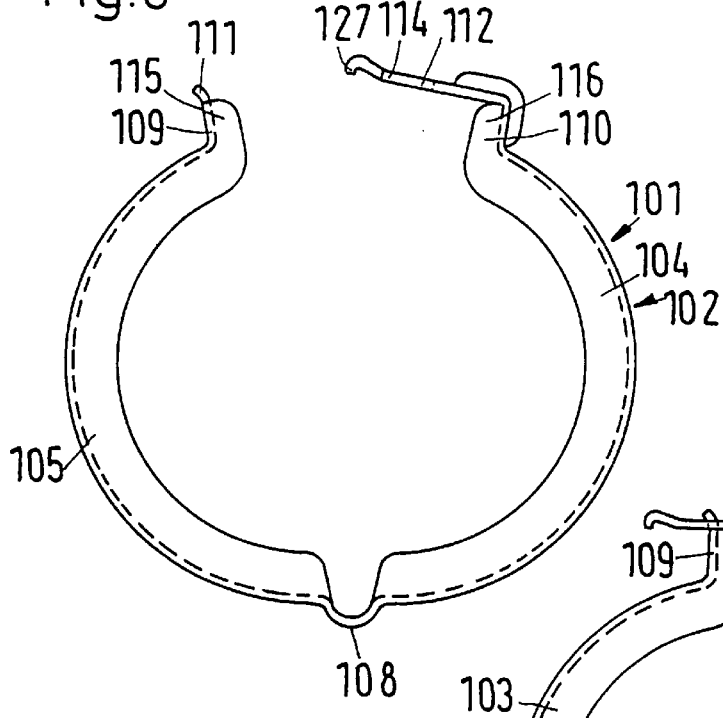
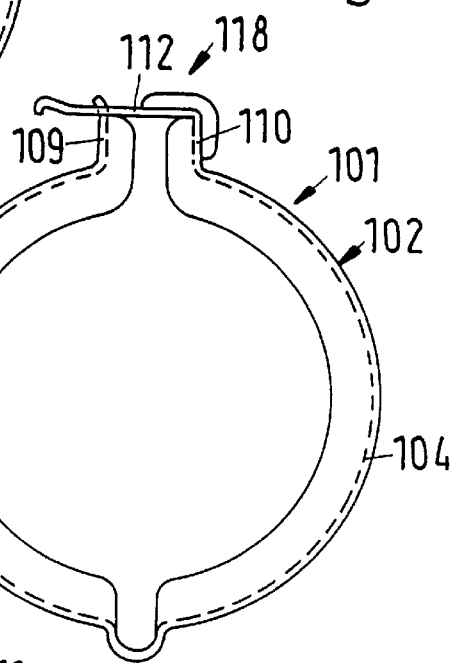
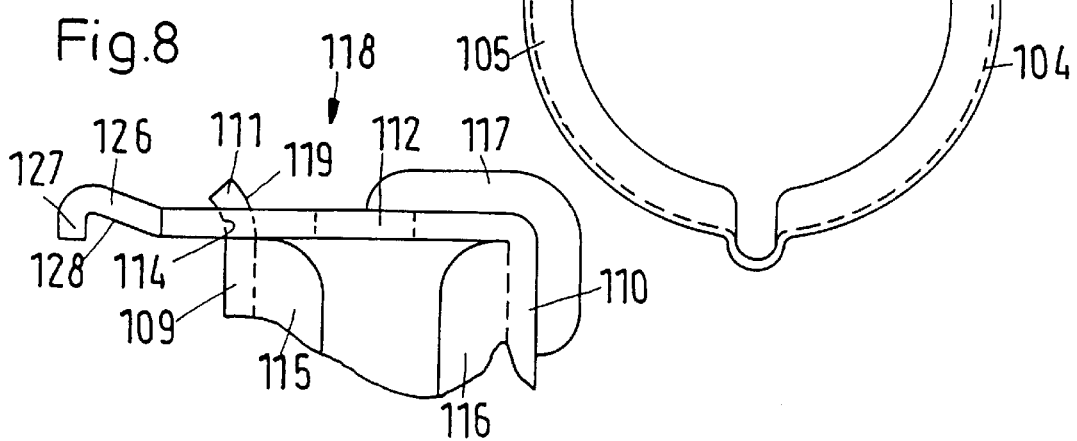
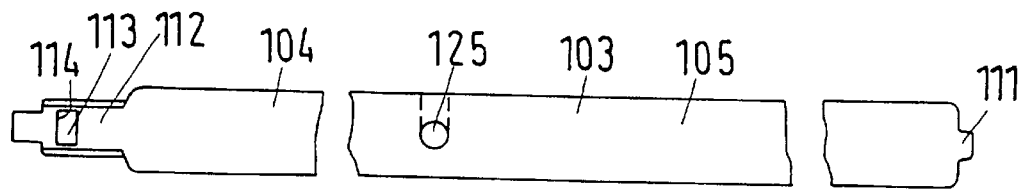

PROFILE CLAMP

BACKGROUND OF THE INVENTION

1. Field of the Invention

The present invention relates to a profile clamp for joining an axial end of one part to the axial end of another part. The axial ends of the parts typically have flanges or a widened end section. The profile clamp includes a clamp band, which is made from sheet metal. The clamp band has flanges that depend radially inwardly on both circumferential sides. The clamp band flanges encompass the flanges or widened end sections of the parts to be joined. The clamp band has stiffened clamping walls that project radially outwardly on both circumferential ends of the clamp band. The two clamping walls are joined together in a closed position to join the axial ends of the parts.

2. Discussion of the Related Art

Profile clamps are known, for example, from German Reference DE 30 38 491 C2. Profile clamps are used to hold together two components that have a flange on their respective axial ends. Thus, the clamp must apply relatively high tensile forces to the flanges of the components to hold the two components together. Conventional profile clamps are tightened by using a screw connection to draw the flanges of the two components together. The screw is tightened to a predetermined torque level. But because of the friction losses that occur in the threads, a significant part of the torque is, in effect, lost. Thus, during mounting (i.e., moving the clamp to a closed position), more energy must be applied than is necessary so that the clamp is placed in the closed position with the required tensile force being applied against the flanges of the two components. Additionally, during mounting, several parts, such as, for example, screws, nuts, guide bushings and stiffening elements, must be fixed at the location where the clamp is being applied, which significantly increase the cost of using the clamp.

German Reference No. DE-OS 22 09 117 discloses a profile clamp that has approximately semi-circular shaped segments. The semi-circular segments have an approximately U-shaped cross-section and are riveted to an elastic retaining band. The profile clamp is flexible between the ends of the semi-circular shaped segments, which is bridged by the elastic retaining band. One end of the retaining band is curved inwardly to form a hook, and the other end is rolled outwardly. An eye is curved out from the retaining band at a distance from the hook. A tongue extends in the circumferential direction and is pressed radially outwardly from the retaining band in the form of a hook or barb. The tongue extends out at a distance from the other end of the band. When the clamp is closed, the two hooks engage with one another. Simultaneously, the rolled end and the eye engage with one another. Thus, this clamp eliminates the need for a screw connection on the ends of the clamp. But this clamp is comprised of at least three parts (i.e., the two semi-circular segments and the elastic retaining band), which are separately manufactured and, thereafter, joined to one another. Further, the configuration of the hooks, eye and rolled end is complex to manufacture. Additionally, the ends of the retaining band, when connected, can withstand only relatively low tensile forces because the hooks and eyes can be bent rather easily.

Swiss Reference No. CH-PS 589 817 discloses a profile clamp that has end sections that have tongues that are pressed out of the clamp band to form barbs. The tongues engage in apertures in a connecting band that bridges the end sections. An eye, which is pressed outwardly, is disposed in the center of the connecting band. To tighten the clamp, the eye is compressed. Thus, this clamp also eliminates the need for a screw connection. This clamp is comprised of two parts, which are separately manufactured and assembled. Further, the attachment of the connecting band in the hooks is difficult to achieve and the compression of the eye requires additional distortion forces. Additionally, the eye cannot withstand high tensile forces and, thus, spreads apart relatively easily.

Therefore, it is an object of the present invention to provide a profile clamp that is less expensive to manufacture and use and can be assembled relatively easily.

SUMMARY OF THE INVENTION

These and other objects are achieved in accordance with the present invention by a one-piece unitary clamp construction. A clamp band has a first axial end, a second axial end, a first circumferential end portion and a second circumferential end portion. A first clamping wall projects radially from the first circumferential end portion. A second clamping wall projects radially from the second circumferential end portion. An approximately circumferentially extending web is connected to the radial outer end of the second clamping wall. The web has an abutment adjacent to its free end, which, together with a locking hook on the first clamping wall, forms a snap closure that can be actuated by pressing the two clamping walls together. A first flange depends from the first axial end of the clamp band. A second flange depends from the second axial end of the clamp band. The two radially extending clamping walls are stiffened by curved side flanges that merge into the respective flanges of the adjacent portion of the clamp band. The merger between the circumferentially extending web and the radial outer end of the second clamping wall is also stiffened by distortion (i.e., bending) of the material. The degree of stiffening between the web and the second clamping wall is less than the degree of stiffening between the clamping wall and the clamp band. The locking hook projects as a slightly angled tongue on the outer free end of the first clamping wall. A stop for the web is formed by a portion of the first clamping wall, which is adjacent to the locking hook when the clamp is in the closed position. An abutment for the locking hook is formed by the edges of a cut-out or opening in the web. The locking hook has a width that is less than a width of the web so that it can be received in the opening when the clamp is in the closed position. The web is angled slightly radially outwardly at its free end.

Because the profile clamp is in one piece, all the additional parts that were previously necessary to effect the screw connection are eliminated, thereby reducing the weight of the clamp and the costs for manufacturing and using the clamp. To move the clamp into the closed position, a tool, for example, a pair of pliers, is used to apply pressure to the clamping walls thereby pressing the clamping walls together until the snap closure latches. The latching of the snap closure can be easily recognized by a user because a metallic clicking noise is made at the moment of latching. The assembler is, therefore, assured that the final, closed position of the profile clamp has been achieved, even when a visual check of the state of the clamp is difficult, if not impossible, to achieve.

Substantially smaller forces are required to close the profile clamp as compared to a screw connection. The energy requirements to close the clamp are, therefore, correspondingly lower during assembly, which is particularly noticeable in mass assembly operations. The one-piece clamp, with the stiffening provisions, allows the amounts of tensile forces that are typically required to be applied by profile clamps to be applied without a permanent distortion of the clamp occurring. The tension applied by the clamp when in the closed position is, thus, solely determined by the dimensioning of the profile clamp. Accidents, such as, applying too great of a tensile force by overtightening of the screw connection, are not possible with the clamp according to the present invention. The assembly time is relatively short because all of the parts are securely fixed to the clamp band, and, therefore, are, by definition, in the correct position with respect to one another. The assembly time is also relatively short because moving the profile clamp to the closed position is easily and quickly achieved by using a pair of pliers.

In contrast to screwless conventional hose clamps, the profile clamp according to the present invention is an extremely stable structure. The profile clamp band is especially stable in the area of the clamp band because of the curved flanges and in the snap closure area because of the stiffening provided there. Because of the stability of the clamp, the present inventors have surprisingly discovered that a snap closure can be used while still applying the relatively high tensile forces to the flanges of the components being joined together by the clamp. Despite the additional stiffening, the two ends of the two clamping walls can be slightly moved with respect to one another during the closing procedure. The two clamping walls move toward one another with a sufficient amount of overtravel in the circumferential direction to permit the snap closure to be effected. Substantially simultaneously, the web moves with a sufficient amount of overtravel in the radial direction to permit the snap closure to be effected. The overtravel in the radial direction is compensated for by the free end of the web, which is displaceable by a small angle to permit the snap closure to be effected.

A particularly effective stiffening of the two clamping walls can be produced by side flanges of the two clamping walls, which merge into the flanges of the adjacent clamp band. The present inventors have discovered that stiffening the edges of the clamp produces a clamp that is substantially more stable than a clamp that is stiffened with a central bead.

The circumferentially extending web and its transition to the second clamping wall are stiffened, at least in part, by bending the material to create a natural, biasing, return force. This return force is exerted on the web, thereby ensuring that the snap closure will close.

The degree of stiffness between the web and the second clamping wall is preferably less than the degree of stiffness between the second clamping wall and the clamp band. The degree of stiffness is relatively lower between the web and the second clamping wall because the web needs to be stiffened only to ensure that the required return force of the web is achieved. Thus, the stiffening of the web does not need to be substantial in size.

The web and the transition to the second clamping wall are preferably further stiffened by a bead disposed on the radial outer portion of this juncture to produce the return force.

The locking hook preferably projects as a slightly angled tongue on the outer end of the first clamping wall. Therefore, an inclined surface is produced on the locking hook, which facilitates the introduction of the locking hook into the opening in the web and also makes disengagement of the hook from the abutment difficult.

A stop for the web, when it is in the closed position, is preferably disposed adjacent to the locking hook to ensure that the web has a precisely defined position in the closed position. Thus, the tensile forces applied by the clamp can be relatively precisely predetermined.

The abutment is preferably formed by the edges of a cut-out or opening in the web. The locking hook has a width that is less than the width of the web. The web is preferably flat up to the opening, and, thereafter, slightly inclines radially outwardly to its free end. This slight angling of the web at its free end facilitates the introduction of the locking hook into the opening. The engagement of the locking hook within the opening in the web is secure in both the circumferential and axial directions.

The snap closure preferably rests in a stop position that precedes the closed position. In the stop position, the clamping walls are spaced further apart from one another than in the closed position. In the stop position, the assembler may first loosely join the two flanged components together to ensure that they are in the proper position and, thereafter, may join the two components together by moving the clamp from the stop position to the closed position with a pair of pliers.

The stop position is preferably formed by a barb in the free end of the web that engages with the locking hook.

BRIEF DESCRIPTION OF THE DRAWING FIGURES

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein:

FIG. 1 is a plan view of a profile clamp according to the present invention in the position in which it is typically supplied to an end user;

FIG. 2 is a plan view of the clamp of FIG. 1 shown in the closed position;

FIG. 3 is an enlarged partial plan view of the snap closure of the profile clamp of FIG. 1 and 2;

FIG. 4 is a plan view of a band that is used to produce the profile clamp of FIGS. 1–3;

FIG. 5A is a partial sectional view of a connection of flanges from two components by a profile clamp according to the present invention and illustrates the clamp in the stop position; and FIG. 5B is a partial sectional view of a connection of flanges from two components by a profile clamp according to the present invention and illustrates the clamp in the final, closed position;

FIG. 6 is a plan view of a second embodiment of a profile clamp according to the present invention in the position in which it is typically supplied to an end user;

FIG. 7 is a plan view of the clamp of FIG. 6 shown in the closed position;

FIG. 8 is an enlarged partial plan view of the snap closure of the profile clamp of FIGS. 6 and 7; and FIG. 9 is plan view of a band that is used to produce the profile clamps of FIGS. 6–8.

DETAILED DESCRIPTION OF THE PREFERRED EMBODIMENT

Referring now to FIGS. 1–6, a profile clamp 1 is illustrated. Profile clamp 1 includes a clamp band 2 that has a plurality of flanges 3. Flanges 3 are inclined towards one another (see FIGS. 5a and 5b), thereby forming the profile. In the rest position, flanges 3 are inclined at an angle α of, for example, approximately, 40°. Flanges 3 are not continuous about the periphery of clamp band 2, but instead are interrupted by a bending or cutout section 8 so that, in the illustrated embodiment, four flange segments 4, 5, 6, and 7 are produced on each axial end of clamp band 2. The four flange segments are each joined to an adjacent flange segment by a deformable bending section 8 (see FIG. 4). An approximately radially outwardly directed first clamping wall 9 is disposed at a first circumferential end portion of clamp band 2. An approximately radially outwardly directed second clamping wall 10 is disposed at a second circumferential end portion of clamp band 2. A locking hook 11 is disposed at the free end of the first clamping wall 9. Locking hook 11 is configured as a tongue and is slightly angled with respect to the first clamping wall 9. Locking hook 11 is not as wide in the axial direction as clamping wall 9 (see FIG. 4). A web 12, which has an opening 13, is disposed at the free end of the second clamping wall 10. An edge of opening 13 forms an abutment 14 to receive locking hook 11 when the clamp is in the closed position (see FIG. 3). The two clamping walls 9, 10 each have a pair of side parts or flanges 15, 16, respectively. Side parts 15, 16 merge into the respective flange 3 of the clamp band 2, and, therefore, stiffen the clamping walls 9, 10 and the angle between walls 9, 10 and the clamp band 2. An L-shaped bead 17 is disposed radially outside of and is connected to web 12 and clamping wall 10 to further stiffen web 12, clamping wall 10 and the angle therebetween. The outer circumferentially extending edges of web 12 are bent upwards to further stiffen web 12 (see FIG. 4).

The locking hook 11 and abutment 14 form a snap closure 18 that automatically enters into the closed position (see FIGS. 2 and 3) when the profile clamp is moved from the open position (see FIG. 1) to the closed position by, for example, a clamping tool that applies pressure to the clamping walls 9 and 10. During this closing movement, an inclined surface 19 of hook 11 first slightly contacts against an inclined surface 20 of web 12, thereby causing the abutment 14 on the free end of web 12 to be displaced upwardly (i.e., in the radial outward direction). Thus, web 12 pivots radially outwardly about its end that is disposed remote from the free end (i.e., web 12 pivots about its end that is connected to clamping wall 10). During this closing movement, the outer ends of the clamping walls 9 and 10 are pressed together by an extent that is sufficient to produce a predetermined amount of overtravel in the circumferential direction for the clamping walls 9, 10 and in the radial direction for web 12. As soon as the amount of overtravel is sufficiently large, web 12 snaps back in the radial inward direction due to its own natural biasing, which is mainly created by bead 17. When web 12 snaps radially inwardly, a clear audible clicking noise is produced. Clamp 1 is then in the closed position (see FIG. 3). In the closed position, a stop is formed by the abutment of an upper end (i.e., a radially outwardly facing) surface of clamping wall 9 and/or the upper end surface of side part 15, which contacts against the lower end (i.e., a radially inwardly facing) surface of web 12. Web 12 strikes this stop due to the return force created by its own natural resilience.

Profile clamp 1, with its snap closure, is formed from a single strip of sheet metal, as shown in FIG. 4. The sheet metal is then bent into the shape illustrated in FIG. 1.

FIGS. 5A and 5B illustrate a widened end section 21 of a thin-walled corrugated pipe 22, which is fixed onto a flange 23 on the end of a second pipe. The external walls of flange 23 are disposed at an inclined angle β with respect to each other. Angle β is somewhat larger than angle α. Thus, when the profile clamp 1 is moved to the closed position so that clamp 1 is clamped tightly about flange 23 and end section 21, flange 3 of the profile clamp 1 is forced to spread out so that angle α increases (See FIG. 5b). The material of the thin-walled end section 21 is forced by clamp 1 to press against flange 23 with a relatively large degree of axial force. Thus, a gas and liquid tight connection is produced between the two pipes. While α is preferably less than β, they can be the same.

Referring now to FIGS. 6–9, a second embodiment profile clamp 101 is illustrated. The reference numerals for like elements in this second embodiment are increased by 100 when compared to the reference numerals used in FIGS. 1–4. Clamp band 102 differs from clamp band 2, inter alia, by being divided into two segments 104 and 105. Thus, there is only one bending section 108 on each axial end of the clamp band 102. Bending section 108 is preferably semicircular or half-wave in shape and, thus, permits clamp band 102 to bend easier so that it may have the desired deformability. Bending section 108 also compensates for tolerances in the circumferential direction. To facilitate the bending of the clamp band, the clamp band material is weakened by an aperture 125.

Clamp band 102 further differs from clamp band 2 in that the web 112 has an extension 126 on its free end. A barb 127 projects radially inwardly and is disposed at the free end of extension 126. Extension 126 has a radially inwardly facing inclined surface 128 to facilitate the introduction of the locking hook 111 into opening 113. Clamp band 102 is placed in a stop position by engaging locking hook 111 with barb 127. In the stop position, the profile clamp is partly, but not completely, clamped. When clamp band 102 is in the stop position, the parts to be clamped together can still be rotated with respect to one another. In other words, referring to FIG. 5A, corrugated pipe 22 can be rotated about its longitudinal axis with respect to flange 23 so that a desired angular orientation in the connection between pipe 22 and flange 23 can be achieved. Once the desired angular orientation is achieved, clamping walls 109 and 110 can be further pressed together so that locking hook 11 moves from the stop position (FIG. 5A) to the closed position (FIG. 5B) where it engages with abutment 114.

In both embodiments, the entire profile clamp, including the snap closure, is made of a single piece of band material, which, when required, can be a heat resistant and/or a corrosion proof material. Moving the clamp into the closed position is typically done with a conventional pair of pliers, which are applied to the clamping walls to manually or pneumatically press the clamping walls toward one another. The tensile force in the closed position is defined fairly precisely by the dimensions of the clamp. Thus, defects in the profile clamp that may occur due to the clamp applying too small or too great of a tensile force cannot occur when the clamp is properly designed. Because the profile clamp does not utilize any screw connections, the time required to assemble the clamp is shortened considerably. Further, because the clamp does not have any projecting screw ends, the clamp is very compact so that it may be used where space limitations are of concern. An additionally advantage of the present invention profile clamp is that the weight, material requirements and number of components is lower as compared to conventional clamps.

What is claimed is:

1. A profile clamp comprising:

a clamp band having a first axial end, a second axial end, a first circumferential end portion and a second circumferential end portion;

a first flange depending from said first axial end;

a second flange depending from said second axial end;

a first clamping wall projecting radially outwardly from said first circumferential end portion;

a second clamping wall projecting radially outwardly from said second circumferential end portion;

an approximately radially extending locking hook being disposed at a free end of said first clamping wall to form a slightly angled tongue;.

an approximately circumferentially extending web being connected to a radial outer end of said second clamping wall, said web having an opening disposed adjacent to a free end of said web, said free end of said web being angled slightly radially outwardly, said opening being defined by a plurality of edges, an abutment being formed by at least one of said edges, said abutment together with said locking hook forming a snap closure that is actuated by moving said first clamping wall towards said second clamping wall so that said clamp band moves from an open position to a closed position, said hook having a width that is smaller than a width of said web, said first and second clamping walls each have side flanges that merge into said flanges of the adjacent clamp band;

wherein, in said closed position, a stop for said web is formed by at least one of a radially outwardly facing surface of said first clamping wall and a radially outwardly facing surface of said side flanges of said first clamping wall, said stop being disposed adjacent to said locking hook.

2. The profile clamp according to claim 1, further comprising a bead connected to said web to stiffen said web and a juncture of said web to said adjacent second clamping wall.

3. The profile clamp according to claim 1, wherein said clamp band has a stop position between the open position and the closed position, in said stop position said first and second clamping walls are disposed further apart from one another than in said closed position.

4. The profile clamp according to claim 3, wherein a barb is disposed at said free end of said web, in said stop position, said barb engaging with said locking hook.

5. The profile clamp according to claim 1, wherein said clamp band is made of one-piece unitary sheet metal.

6. The profile clamp according to claim 1, wherein a stiffness of a juncture between said web and said second clamping wall is less than a stiffness of a juncture between said clamping wall and said clamp band.

* * * * *